United States Patent [19]

Wolf et al.

[11] 4,214,736

[45] Jul. 29, 1980

[54] ARC HEATER MELTING SYSTEM

[75] Inventors: Charles B. Wolf, Irwin; Thomas N. Meyer, Murrysville; Maurice G. Fey, Plum; Francis J. Harvey, II, Murrysville, all of Pa.

[73] Assignee: Westinghouse Electric Corp., Pittsburgh, Pa.

[21] Appl. No.: 32,326

[22] Filed: Apr. 23, 1979

[51] Int. Cl.² ............................ C21C 5/52; H05B 7/18
[52] U.S. Cl. ..................................... 266/200; 13/9 R; 75/12
[58] Field of Search ....................... 266/200; 75/10-12; 13/9 R

[56] References Cited

U.S. PATENT DOCUMENTS

| | | | |
|---|---|---|---|
| 2,978,315 | 4/1961 | Schenck | 75/10 R |
| 4,080,194 | 3/1978 | Fey | 75/10 R |

*Primary Examiner*—P. D. Rosenberg
*Attorney, Agent, or Firm*—L. P. Johns

[57] ABSTRACT

Apparatus for melting metal chips comprising a preheating chamber, a prereducing chamber, and a melting chamber, the latter comprising a metallurgical vessel having a refractory wall with arc heater means mounted on the wall and extending therethrough which arc heater means provides an electric plasma arc which extends through an opening in the refractory wall, and the arc heater means comprising a downstream cylindrical electrode extending through the refractory wall for improved heating efficiency.

5 Claims, 4 Drawing Figures

ARC HEATER MELTING SYSTEM

CROSS-REFERENCE TO RELATED APPLICATIONS

This application is related to copending applications Ser. No. 797,893, filed May 17, 1977, and Ser. No. 032,325, filed Apr. 23, 1979.

BACKGROUND OF THE INVENTION

1. Field of the Invention

This invention relates to an arc heater electrode design.

2. Description of the Prior Art

Arc heaters of the type disclosed in U.S. Pat. Nos. 3,705,975 and 3,832,519 are used for industrial applications to heat a wide range of gas compositions which can be used for heating a furnace cavity in chemical and/or metallurgical processing. A disadvantage of that arrangement is that the high temperature gases exiting from the arc heater must pass through the walls of the furnace. Where the furnace is lined with refractories, the remote location of the arc heater gas heating can significantly reduce the effective efficiency. In addition, special precautions are taken such as providing a cool layer of gas on the refractory surface, or a special water cooled entry section.

SUMMARY OF THE INVENTION

It has been found in accordance with this invention that an improved arc heater structure may be provided which comprises apparatus for melting metal chips including a metallurgical vessel forming a melting chamber and having a refractory wall with an aperture therethrough, an arc heater mounted on the outer surface of the refractory wall and having an end opening communicating with the melting chamber through the aperture, the arc heater having axially spaced cylindrical electrodes forming an arc chamber, one electrode extending through the aligned aperture and opening and toward the melting chamber, means for striking an electric arc in the axial space, means for rotating the arc within the arc chamber, means for blowing gas through the space to form an elongated arc stream comprising gas in the arc and into the melting chamber, whereby said one electrode serves as a heat shield for the refractory wall against the elongated arc stream, the arc heater comprising an annular mounting flange for mounting the arc heater on the refractory wall, said one electrode projecting through the flange, the cylindrical electrodes having coolant jackets which include coolant liquid and outlet conduits, the means for blowing gas including a gas inlet conduit, the conduits for the coolant and gas extending through the annular mounting flange, the spaced electrodes terminating in opposed cylindrical end portions, and the other cylindrical electrode being contained within an enclosing cover.

The advantage of the apparatus of this invention is that it provides for improved heating efficiency by extending the downstream electrode into a furnace wall with the additional advantage of protecting the refractory wall.

DESCRIPTION OF THE PREFERRED EMBODIMENT

Figure 1:
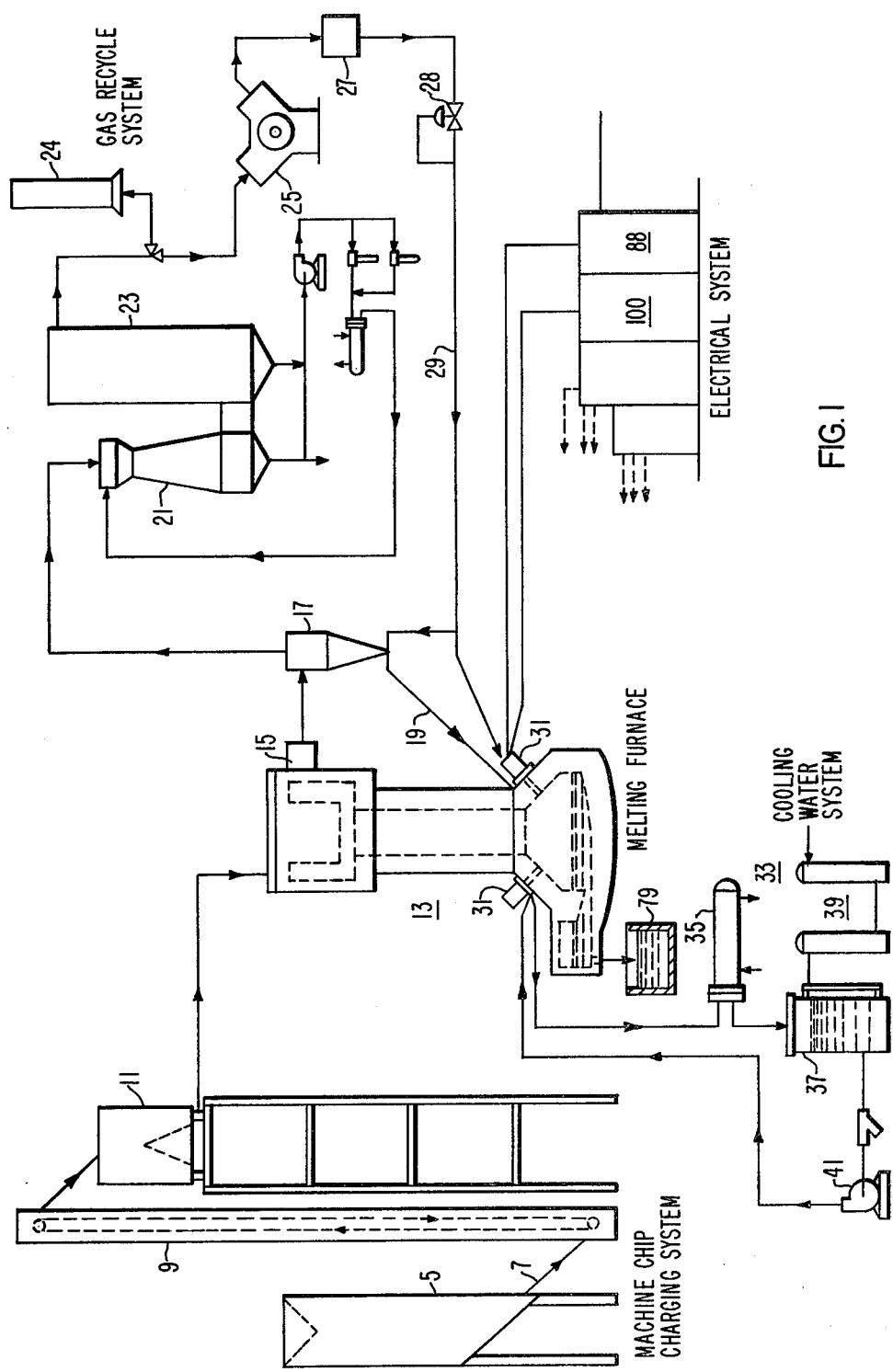
FIG. 1 is a flow diagram.

In FIG. 1 a system for handling metal chips, such as aluminum, brass, bronze, copper, cast iron, steel, superalloys, as produced in a machine shop, is shown. The system comprises a storage bin 5 for metal chips which are dispensed at outlet 7 into the lower end of an elevator 9. The chips are dumped from the upper end of the elevator into a holding bin 11 from where they flow as required to a chip melting furnace generally indicated at 13. Exhaust gas issues from an outlet 15 to a cyclone type separator 17 from where solid particles return to the furnace via a conduit 19.

Gas from the cyclone separator 17 moves from the top to a scrubber 21 from where it flows to a gas recycle system that includes a moisture remover or demister 23. From there it flows to a compressor 25, a dryer 27, a flow regulator 28, and then through a conduit 29 to a plurality of arc heaters 31 associated with the furnace 13. A gas burnoff stack 24 may be used for excess gas.

A water cooling system generally indicated at 33 for cooling water from the arc heaters 31 includes a heat exchanger 35, holding tank 37 which includes a water deionizer 39, and a pump 41 by which coolant water is circulated into and out of the arc heaters 31.

Figure 2:
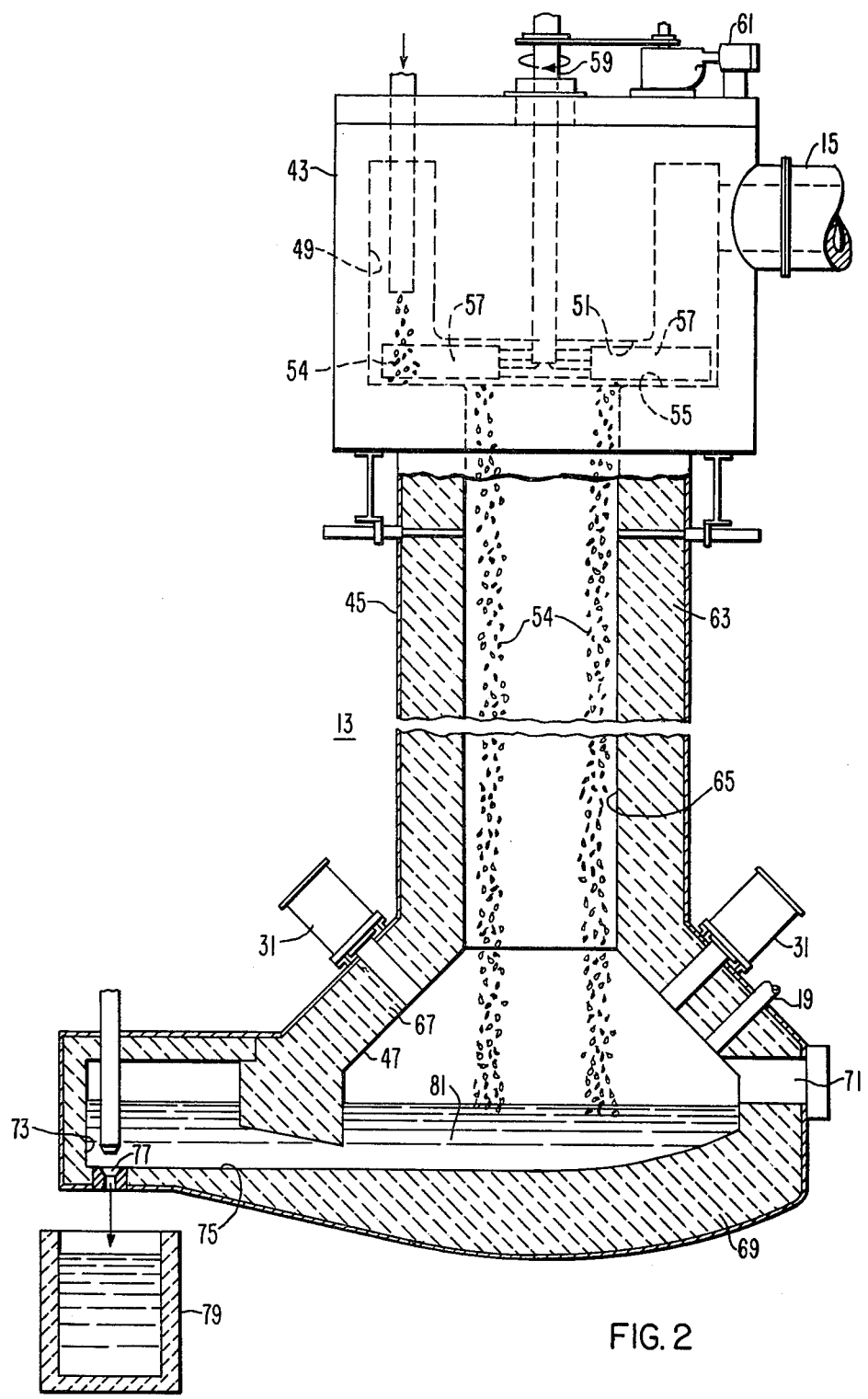
FIG. 2 is a vertical sectional view, partly in elevation, of a melting furnace for metal particles.

As shown more particularly in FIG. 2 the melting furnace 13 comprises a preheating section 43, a prereducing section 45, and a melting chamber 47. The preheating section is substantially a heat holding zone comprising a refractory body which includes an annular chamber 49, the lower end of which communicates with a horizontal chamber 51. A feed chute delivers metal chips 54 from the holding bin 11. The chips fall upon a generally horizontal surface 55 where they are moved radially inwardly by rotating rabbles 57 which extend outwardly from the lower end of a driven shaft 59 that is driven by motor means 61.

The prereducing section 45 is a vertically tubular structure having a refractory wall 63 that forms a prereducing chamber 65 the upper end of which communicates with the annular surface 55 of the radial chamber 51.

The melting chamber 47 includes a truncated wall 67, a bottom wall 69, a slag hole 71, a liquid metal holding chamber 73 and a passage 75 communicating between the melting chamber 47 and holding chamber 73. A tap hole 77 is included in the bottom wall 69 for tapping metal into a mold 79. Accordingly, the furnace 13 receives metal chips, such as iron chips 54, through the chute 53. The chips fall upon the surface 55 where they are preheated as they are moved radially inwardly by the rabbles 57 to the prereducing chamber 65 where they drop to the melting chamber 47 to form a molten body 81. As the chips move through the furnace 13, they move in counterflow to reducing gas which enters the furnace through the arc heaters 31 and rises from the melting chamber 47 through the prereducing chamber 65 and the preheating chamber 51 to the gas outlet 15 from where it flows through a gas recycle system as set forth above.

The arc heater 31 is similar in construction and operation to that disclosed in U.S. Pat. No. 3,705,975, but differs in some details as described herein. Generally, the arc heaters 31 are each a single phase, self-stabilizing AC device capable of power levels up to about 3000 kilowatts, or up to about 9000 kilowatts for a three-phase plant installation. In the practice of this invention it is preferred that six arc heaters be employed, two for each of the three phases of the AC power supply.

Figure 3:
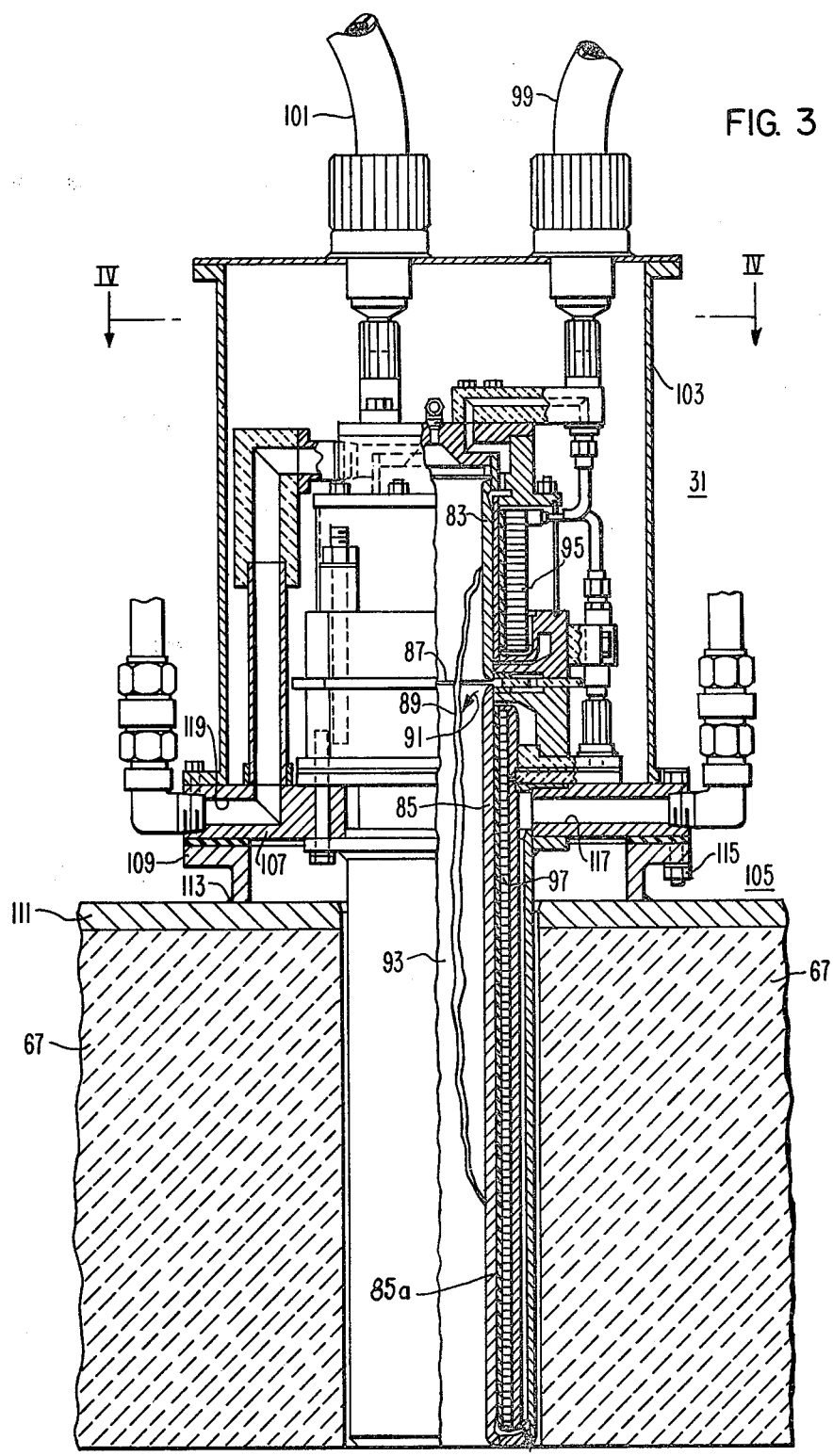
FIG. 3 is a vertical sectional view through an arc heater mounted in a portion of the furnace wall.

As shown in FIG. 3 the arc heater 31 has two annular copper electrodes 83, 85 which are spaced at 87 about 1 millimeter apart to accommodate a line frequency power source 88 (FIG. 1) of about 4 kV. An arc 89 occurs in the space or gap 87 and incoming feedstock gas 91 immediately blows the arc from the space into the interior of the arc chamber 93.

The feedstock gas 91 must be compatible with the particular metal being reduced in the furnace 13 and may be one of the gases selected from the group consisting of argon, helium, methane, hydrogen, steam, reformer gas, air, nitrogen, carbon monoxide, or mixtures thereof. The arc 89 rotates at a speed of about 1000 revolutions per second by interaction of the arc current (several thousands amps AC) with a DC magnetic field set up by internally mounted field coils 95, 97. The velocities yield a very high operating efficiency for equipment of this type and the elongated arc 89 is ultimately projected by the gas downstream toward and possibly into the melting chamber 47. A cable 99 (FIG. 3) provides a source 100 (FIG. 1) of 40 volt, DC current to the spaced coils 95, 97. Similarly, a cable 101 of AC current at about 4000 volts is disposed at the upper end of the furnace 31. Both cables 99, 101 are mounted in place by means of a cover assembly 103 which encloses the upper portion of the arc heater 31 to prevent dust and other contaminants from the atmosphere from depositing on the otherwise exposed electrical terminals and causing flashover due to the high voltage involved.

Figure 4:
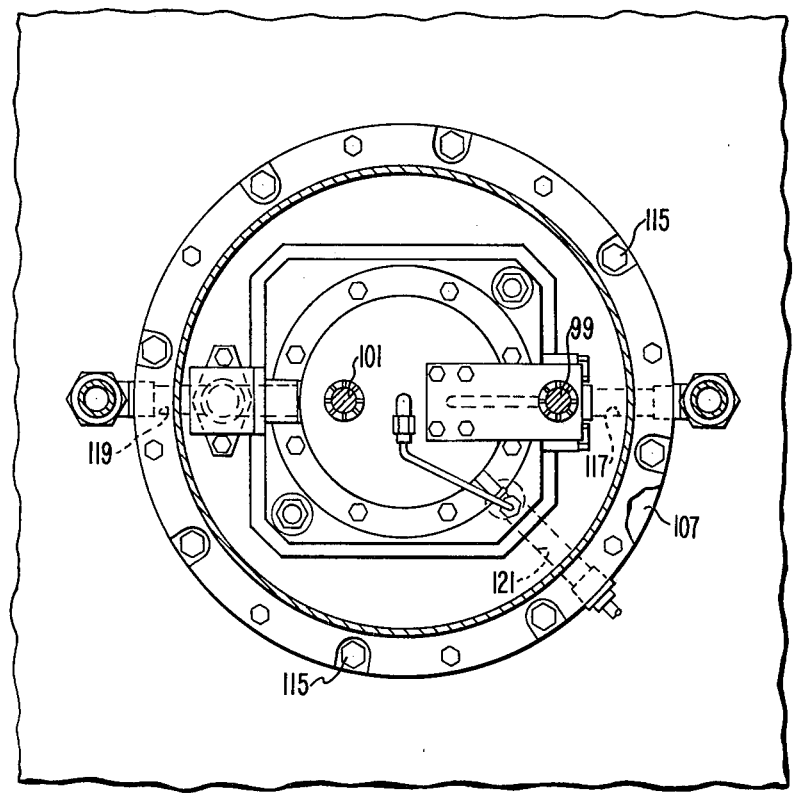
FIG. 4 is an end view of the arc heater as shown in FIG. 3.

In accordance with this invention, each arc heater 31 comprises a mounting assembly generally indicated at 105 comprising flanges 107, 109. The flange 107 is secured to the outer metal surface 111 of the melting chamber 47 by suitable means, such as a weld 113, and the flange 107, 109 are secured by radially spaced nut and bolt assemblies 115. The flange 107 includes a water inlet 117 and a water outlet 119 by which coolant water is circulated into the arc heater for cooling the electrodes 83, 85 in a manner similar to that set forth in U.S. Pat. No. 3,705,975. Similarly, a gas inlet 121 (FIG. 4) is provided for conducting feed gas 91 to the space or gap 89 and to the upstream end of the arc heater.

Moreover, in accordance with this invention, the spaced end portions of the electrodes 83, 85 at the gap or space 87 terminate in aligned, spaced, cylindrical portions devoid of out-turned radial flanges or enlarged portions as existed in arc heaters of prior construction. The resulting electrodes 83, 85 are less costly to manufacture. Furthermore, in accordance with this invention the downstream electrode 85 extends at 85a (FIG. 3) through the wall 67 of the furnace 13 to prevent the refractory in the wall from direct exposure to the high temperatures of the arc 89, or arc-heated gases and also focusing the arc more directly toward the surface of the molten body 81.

In conclusion, by extending the downstream end of the electrode through the wall of the furnace or other enclosure, the actual gas heating is performed closer to the reaction zone. An additional advantage is obtained in that the mounting flange is removed from the arc heater outlet. Thus, overall efficiency is achieved by bringing the arc heater closer to the melting zone of the furnace. This improvement is accomplished by redesigning the internal arc heater field coil surrounding the downstream electrode to simplify its cooling requirements and a relocation of its electrical connections. Moreover, the structure of this invention is more conducive to arcing between upstream electrodes of the multiple arc heater design; e.g., two-phase, three-phase structures. The downstream electrodes are brought into the working zone are not in intimate contact with the reactor walls or liners. Finally, the improved arc heater structure of this invention employs a continuously tubular electrode which is more readily fabricated removed and replaced, as compared with flange electrodes of prior construction.

What is claimed is:

1. Apparatus for melting metal chips comprising:
   (a) a metallurgical vessel forming a melting chamber and having a wall with an aperture therethrough,
   (b) an arc heater mounted on the outer surface of the wall and having an end opening communicating with the melting chamber through the aperture,
   (c) the arc heater having axially spaced cylindrical electrodes forming an arc chamber,
   (d) one cylindrical electrode extending beyond the outer surface of the wall and through the aperture and opening and toward the melting chamber,
   (e) means for striking an electric arc in the axial space,
   (f) means for rotating the arc within the arc chamber, and
   (g) means for blowing gas through the space to form an elongated arc stream comprising the gas and the arc and into the melting chamber, whereby extension of the electrode far enough toward the melting chamber retards errosion of the wall by the arc stream.

2. The apparatus of claim 1 in which the arc heater comprises an annular mounting flange for mounting the arc heater on the refractory wall, and said one electrode projecting through the flange.

3. The apparatus of claim 2 in which the cylindrical electrodes have coolant jackets which include coolant inlet and outlet conduits, the means for blowing gas including a gas inlet conduit, and the conduits for coolant and gas extending through the annular mounting flange.

4. The apparatus of claim 1 in which the axially spaced electrodes terminate in cylindrical end portions.

5. The apparatus of claim 1 in which the other cylindrical electrode is contained within a cover.

* * * * *